US005182553A

United States Patent [19]
Kung

[11] Patent Number: 5,182,553
[45] Date of Patent: Jan. 26, 1993

[54] COMMUNICATION RECEIVER PROVIDING DISPLAYED OPERATING INSTRUCTIONS

[75] Inventor: Patrick S. Kung, West Palm Beach, Fla.

[73] Assignee: Motorola, Inc., Schaumburg, Ill.

[21] Appl. No.: 576,742

[22] Filed: Sep. 4, 1990

[51] Int. Cl.⁵ ............................................. H04Q 7/00
[52] U.S. Cl. ............................... 340/825.44; 455/70; 364/948.21; 364/946.2
[58] Field of Search .............. 340/825.44, 825.15; 455/70; 379/63; 341/21; 364/963, 963.3, 963.5, 948.21, 946.2, 946.9

[56] References Cited

U.S. PATENT DOCUMENTS

| 4,658,359 | 4/1987 | Palatucci et al. | 364/900 |
| 4,786,902 | 11/1988 | Davis et al. | 340/825.44 |
| 4,839,628 | 6/1989 | Davis et al. | 340/825.44 |
| 4,849,750 | 7/1989 | Andros et al. | 340/825.44 |

FOREIGN PATENT DOCUMENTS 1-114220  5/1989  Japan .................................. 341/22

OTHER PUBLICATIONS

"PMR 2000" Series Alphanumeric Display Radio Pager Operating Instructions, Publication No. 68P81048C90-0, published 1986 by Motorola Inc., Paging Division, Boynton Bch Fla.

Primary Examiner—Donald J. Yusko
Assistant Examiner—Peter Weissman
Attorney, Agent, or Firm—Philip P. Macnak; William E. Koch; Thomas G. Berry

[57] ABSTRACT

A communication receiver (12) comprises a receiver (54) for receiving selective call signals including messages and further for receiving a receiver operating instruction, a control (82) for controlling a receiver function, a memory (67) for storing the received receiver operating instruction describing the operation of the receiver function being controlled, a retrieval circuit (58) for recalling the stored receiver operating instruction, and a display (84) for presenting the received messages, and further for presenting the recalled operating instruction. The memory (67) can also store information enabling the controllable receiver function, and both the enabling information and the receiver operating instruction can be reprogrammed to reconfigure the operation of the communication receiver.

22 Claims, 6 Drawing Sheets

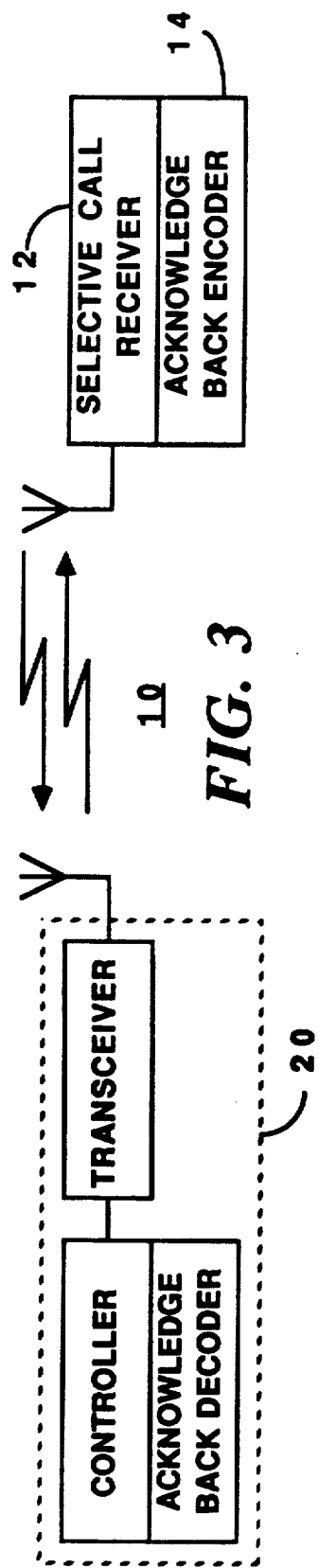
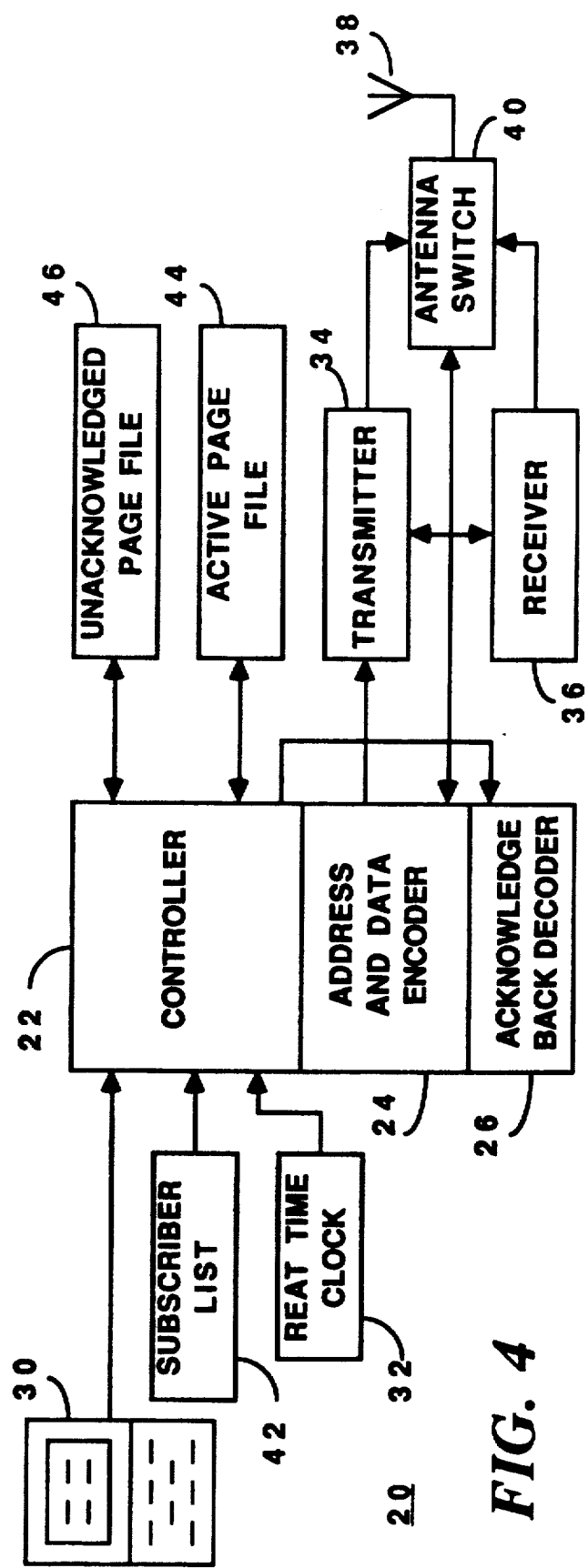
FIG. 3
FIG. 4

COMMUNICATION RECEIVER PROVIDING DISPLAYED OPERATING INSTRUCTIONS

BACKGROUND OF THE INVENTION

1. Field of the Invention

This invention relates to portable communication receivers having memories, and more particularly to a display paging receiver providing displayed receiver operating instructions.

2. Description of the Prior Art

As communication receivers, and in particular paging receivers, have evolved from tone only paging receivers, to numeric paging receivers, and to alphanumeric paging receivers, the user interface, or operational controls of such paging receivers have become increasingly more complicated. As the number of functions and features being provided within the paging receivers have increased, it has become exceeding more difficult to provide controls for the receiver operation which are easy to use.

Traditionally, a user operation instruction manual has been shipped with each paging receiver, to instruct the user in the proper methods of operation. However, the use of such instructions manuals presents a number of potential problems. Since the instruction manual is a separate entity from the paging receiver, there is always an issue of where the manual is to be stored when the manual is not being used, and as a consequence, the user operation instruction manual often becomes misplaced or lost.

Many paging receivers today are also available with a number of user selectable options which are programmed into the paging receiver, either at the time the paging receiver is purchased from the manufacturer, or at the time the user secures the paging receiver for use. Thus, much of the user operation information which is provided in the user operation instruction manual may not be applicable to each individual paging receiver user. As a result, it often became more difficult for the user to locate the appropriate information for the features which were provided with the users specific paging receiver.

Because many of the newer paging receivers are implemented using microcomputers which are controlled by firmware routines which are stored in electrically eraseable programmable read only memories (EEPROMs), it has become feasible, in many instances, to add additional features not previously available, by simply reprogramming the EEPROM. When a new feature is added which was not previously available, the original user operation instruction manual would, as a result of the reprogramming, be inadequate for describing the operation of the new feature, and as a result supplemental user operating instructions are required to instruct the user in the operation of the added feature. The supplemental operating instructions, as a result, become yet another piece of paper which could be misplaced, or lost, by the user of the paging receiver.

A number of the newer paging receivers will also be capable of having the paging receiver operating system, or features, reprogrammed by means of radio frequency, or over-the-air reprogramming techniques. In the case of over-the-air reprogramming of paging receiver functions, the problem of providing the user with operating instructions becomes even more acute. In the case where over-the-air reprogramming is provided, arrangements would have to be made in advance, to insure the user was provided with whatever supplemental operating instructions may be required, otherwise the user may find it impossible the operate the reprogrammed paging receiver.

In still another instance, problems with a paging receiver may be detected only well after the paging receiver is placed in service. Many of these problems can be resolved by reprogramming the firmware used to control the operation of the paging receiver. However, in so doing, additional problems may be created which can affect the way the paging receiver is to be operated. When this happens, it is becomes even more difficult to provide supplemental information to alert the user of the paging receiver, that changes in the operation of the paging receiver may be required, especially if the changes indicated are reprogrammed over-the-air.

SUMMARY OF THE INVENTION

It is an object of the present invention to provide a more convenient means for providing receiver operating instructions to the user.

It is a further object of the present invention to provide a means for storing the receiver operating instructions within the paging receiver and recalling the same for display.

It is a further object of the present invention to provide a means for remotely updating the receiver operating instructions stored within the paging receiver.

When a communication receiver is provided with a preset number of operational functions, a table of receiver operating information describing the receiver operation being controlled is stored in a memory within the receiver. The receiver operating information for each operating function is recallable by the user for presentation on the receiver's display which is normally used to display received messages.

When a communication receiver is provided with a number of programmable operational functions, a table of receiver operating information describing the receiver operation which are programmed and being controlled is stored in a memory within the receiver. By storing only the receiver operating information describing the operational functions active, the user is not bothered with receiver operating information not utilized. The receiver operating information for each operating function is recallable by the user for presentation on the receiver's display which is normally used to display received messages.

When a communication receiver is provided with a number of remotely, or over-the-air programmable operational functions, a table of receiver operating information describing the receiver functions which are currently programmed and being controlled is stored in a memory within the receiver. By storing only the receiver operating information describing the operational functions active, the user is not bothered with receiver operating information not utilized. In addition, when a new operational feature is over-the-air programmed into the receiver, the user is immediately informed of the operational changes. The receiver operating information for each operating function is recallable by the user for presentation on the receiver's display which is normally used to display received messages.

BRIEF DESCRIPTION OF THE DRAWINGS

The features of the invention which are believed to be novel are set forth with particularity in the appended claims. The invention itself, however, together with its further objects and advantages thereof, may be best understood by reference to the following description when taken in conjunction with the accompanying drawings, in which:

FIG. 3 is a block diagram of a radio communication system in which the present invention may be advantageously used.

FIG. 4 is a block diagram of a paging terminal and associated apparatus used to send addresses and messages including receiver operating instructions to the system receivers, and to initiate reprogramming of the system receiver functions.

DESCRIPTION OF THE PREFERRED EMBODIMENTS

Figure 1:
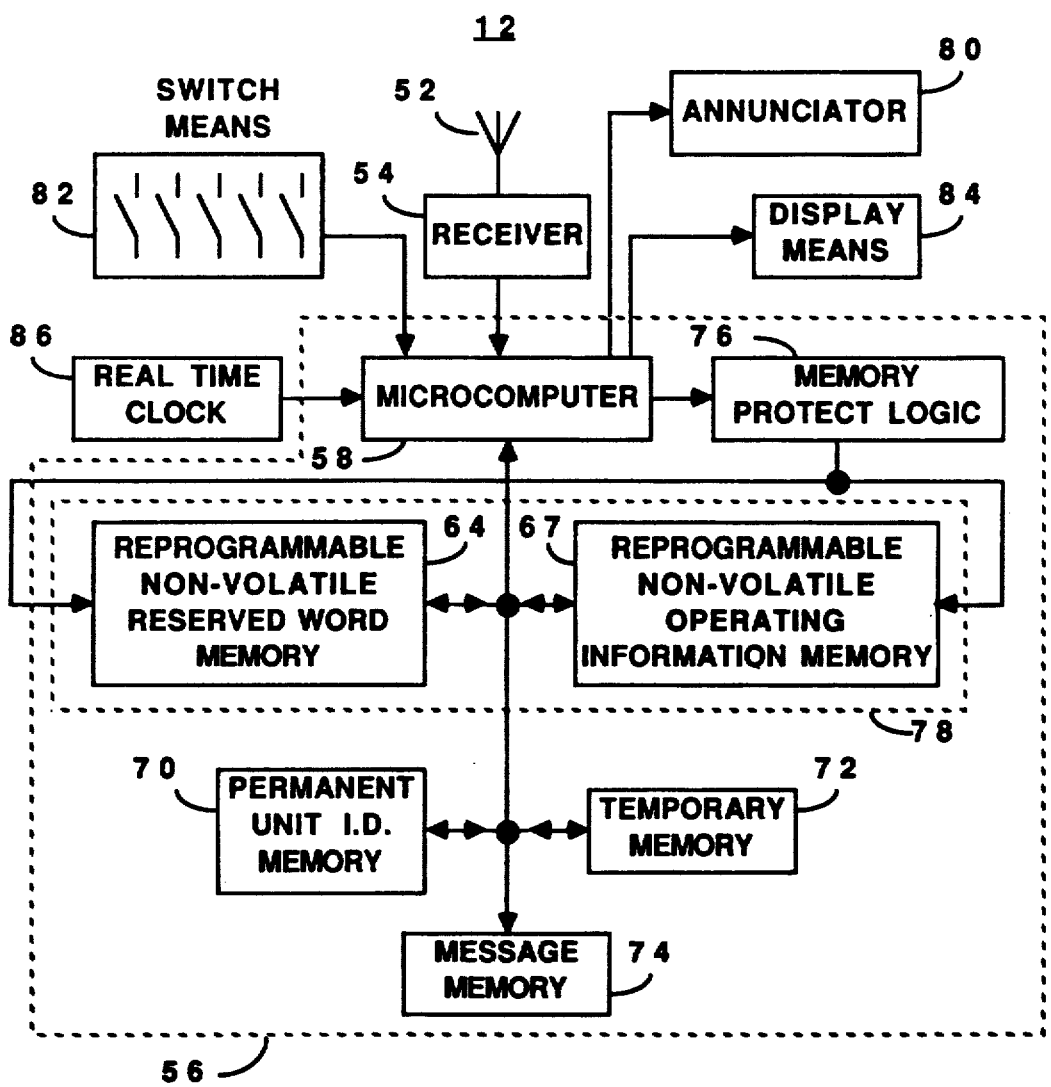
FIG. 1 is a functional block diagram of a selective call receiver having a memory for storing receiver operating instructions which are recallable for display by the user.

FIG. 1 is a functional block diagram of a selective call receiver 12, such as a paging receiver, constructed in accordance with the present invention. Selective call receiver 12 includes antenna 52 and receiver 54 for generally receiving transmitted selective call addresses and message information in a manner well known in the art. Antenna 52 and receiver 54 are also capable of receiving transmitted coded information used to reconfigure the operation of the selective call receiver. The reconfiguration information includes, but is not limited to, receiver control reprogramming information and receiver operating information corresponding thereto. The output of receiver 54 is a stream of binary information which couples to microcomputer 58. Microcomputer 58 is part of decoding system block 56 performing such functions as address decoding, and control of message storage and display functions in a manner well known in the art. Decoding system block 56 may include, in addition to microcomputer 58, temporary memory 72, message memory 74, memory protect logic 76 and protected memory area 78. In the preferred embodiment of the present invention, the protected memory area 78 includes a reprogrammable non-volatile reserve word memory 64 and a reprogrammable non-volatile operating information memory 67. The reprogrammable non-volatile reserve word memory 64 is used to store address code sequences associated with a change in the address or options of the individual receiving unit. The reprogrammable non-volatile operating information memory 67 is used to store receiver operating information describing the receiver operation being controlled, i.e. describing the operation of the various features provided in the receiver. It will be appreciated that memory area 67 is programmed to include a table of receiver operating instructions, or information, which describes the operation of all features available for the receiver, whether or not enabled, or to store just the information describing those features which are currently enabled within the receiver. It will also be appreciated that memory area 67 can also store other information pertinent to the operation of the receiver, such as the number and type of addresses available, including tone only, numeric, alphanumeric, and voice addresses; and information on options available which may not be currently implemented. Other information, such as the operation of a real time clock function, or over-the-air reprogramming operation can be included as well. The content of the protected memory areas can be altered in a first embodiment by directly reprogramming the memory at the factory or by the service provider using a programmer which couples to the protected memory areas in a manner well known in the art, and in a second embodiment in response to receiving reprogramming information received over-the-air, to be described shortly. A more complete description of the elements of decoding system block 56 is provided in U.S. Pat. No. 4,839,628 issued Jun. 13, 1989 to Davis et al., entitled "Paging Receiver having Selectively Protected Regions of Memory" which is assigned to the assignee of the present invention, the disclosure of which is hereby incorporated for reference. A more complete description of the over-the-air reprogramming function is described in U.S. Pat. No. 4,910,510 issued Mar. 20, 1990 to Davis et al., entitled "System for off-the-air reprogramming of Communication Receivers" which is assigned to the assignee of the present invention and which is hereby incorporated by reference herein.

When an address is received by selective call receiver 12, the address is compared to one or more predetermined addresses stored in reprogrammable non-volatile reserve word memory 64 in a manner well known to one of ordinary skill in the art. When the received address matches one of the stored predetermined addresses assigned to the receiver, the message segment transmitted following the receiver address is processed by microcomputer 58 and stored in message memory 74. A sensible alert is generated, such as an audible or tactile alert which is delivered by annunciator 80 to alert the user of the received message. Annunciator 80 can be a transducer when an audible alert is generated or a vibrator when a tactile alert is generated. The stored message may be recalled from message memory 74 by the user with switch means 82, which effects the reading of the stored message for presentation on display means 84 for the user's review. Switch means 82 can be implemented using one or more mechanical or electronic switches to provide user activated functions as will be described below. In addition to reading the stored messages, the switch means 82 provides for such additional receiver control functions such as resetting the sensible alert, protecting stored messages, deleting stored messages, freezing a message on the screen, and controlling the setting and display of time, when real time clock 86 is provided as shown, just to name a few. The actual number of controls provided for controlling the receiver operation is determined by the specific control requirements for each selective call receiver design, as will be described in further detail below.

Figure 2A:
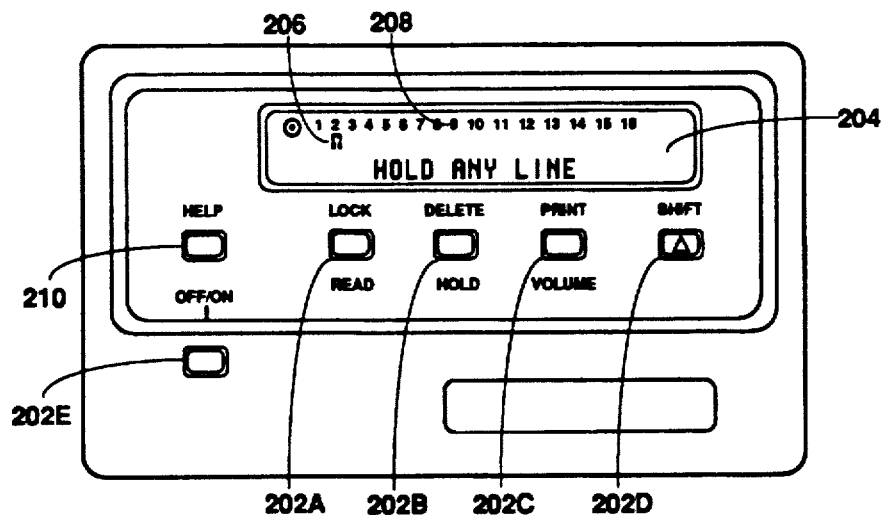
FIGS. 2A-2C are pictorial diagrams illustrating several selective call receiver embodiments for providing user recallable stored receiver operating instructions.
Figure 2B:
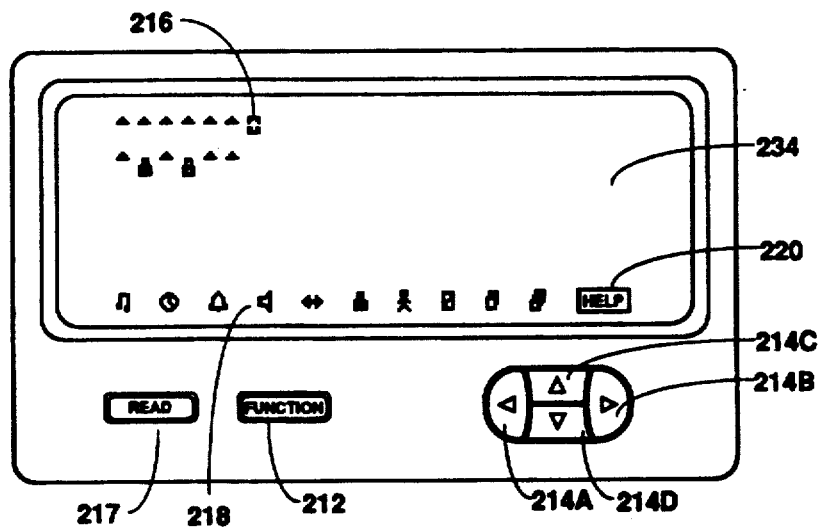
Figure 2C:
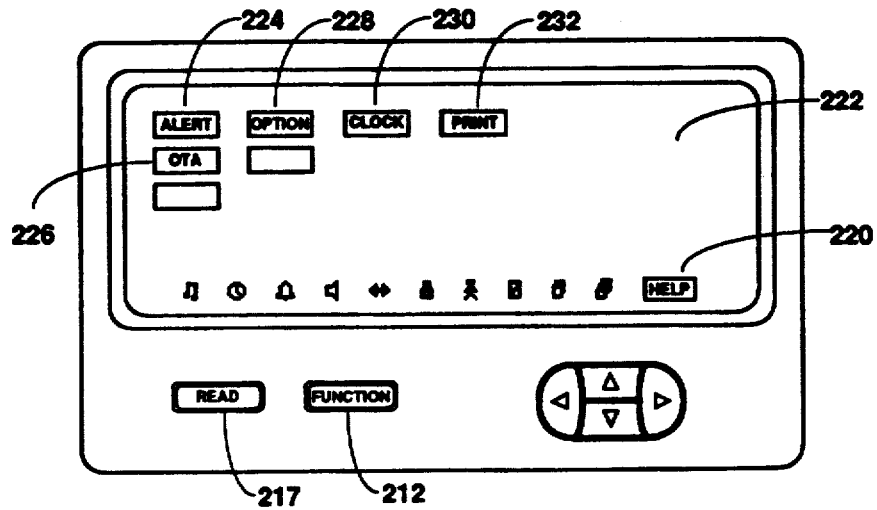

FIGS. 2A-2C are pictorial diagrams illustrating two selective call receiver embodiments providing three receiver control and receiver operating information selection configurations. In the first embodiment shown in FIG. 2A, a number of switches 202A, 202B, 202C, 202D and 202E are provided for controlling the operation of the receiver. In this embodiment, a two line dot matrix display 204 is provided for displaying up to thirty-two characters (sixteen characters per line). The display also provides an indication of which of sixteen memory areas is being read, protected or deleted using a pointer icon 206 which points to one of sixteen fixed numerals 208 designating each of the sixteen selectively retrievable stored message areas. The receiver functions controlled include such functions as reading the stored messages (READ), and protecting, or locking, the stored messages in memory (LOCK) using switch 202A, deleting stored messages from memory (DELETE) and freezing, or holding messages being displayed on the display (HOLD) using switch 202B, adjusting the alert tone, or voice message audio volume (VOLUME), and printing of received messages using an external printer (PRINT) using switch 202C, selecting the second switch function for each switch 202A, 202B and 202C with the shift function (SHIFT) using switch 202D, and turning the receiver on and off (OFF-/ON) using switch 202E. As can be seen from the example of FIG. 2A, the receiver functions which are controllable using the switches provided may not necessarily be apparent to the user of the paging receiver, such as how to read or protect a particular one of the sixteen messages, how to select the deferred paging mode, or how to turn the receiver on and off. In the preferred embodiment of the present invention, this problem is overcome by providing the user with the capability to recall receiver operating information which is stored in the receiver and which describes the receiver operation being controlled by each particular switch or sequence of switch functions. In the first embodiment, in order to recall the stored receiver operating information for any of the controllable receiver functions, a "HELP" key, switch 210 is provided which is used in conjunction with the particular function key, or at least a partial key sequence for which information is required. The use of partial key sequences allows the user who would intuitively know to actuate the "READ" key to read a message, to instruct the user in the actual operation of selecting a particular one or more of the sixteen stored messages using the "READ function. An example of the type of information which is stored and displayed utilizing the present invention is provided in the examples below for the SHIFT key operation, switch 202D, and for the LOCK key operation, switch 202A.

When requesting the receiver operating information associated with the SHIFT key, the user would first actuate the "HELP" key, switch 210 followed by actuating the "SHIFT" key, switch 202D. The normal receiver function associated with the switch being actuated is deferred during the "HELP" function operation. Information typical of what is displayed in a sixteen character per line format for the "SHIFT" function is as follows:

| Screen 1 | WHEN THE SHIFT IS PRESSED, THE |
| Screen 2 | LOCK, DELETE AND PRINT FUNCTIONS |
| Screen 3 | CAN BE PERFORMED |

When requesting the receiver operating information associated with the "LOCK" key, the user would first actuate the "HELP" key, switch 210 followed by actuating the "SHIFT" key, switch 202D, and then the "LOCK" key, switch 202A. Information typical of what is displayed for the "LOCK" function is shown below:

| Screen 1 | AN IMPORTANT MESSAGE CAN BE |
| Screen 2 | "LOCKED" TO PREVENT IT FROM |
| Screen 3 | BEING OVERWRITTEN IN A MEMORY-FULL |
| Screen 4 | CONDITION. TO LOCK A MESSAGE, |
| Screen 5 | POSITION THE CURSOR AT THE |
| Screen 6 | MESSAGE TO BE LOCKED, USING THE |
| Screen 7 | READ BUTTON. PRESS THE "SHIFT" |
| Screen 8 | BUTTON ONCE, THEN PRESS THE 'LOCK' |
| Screen 9 | BUTTON. |

The receiver operating information for each receiver function key, or key function sequence, is recalled from memory, when the "HELP" function is selected, and in this example, is automatically displayed two lines at a time. Each pair of lines is displayed for a predetermined time interval, such as for two seconds to allow the user to read the information in a sequence of screens, as described above.

FIG. 2B shows a second embodiment of a selective call receiver providing user selectable receiver operating information. In the example of FIG. 2B, a function screen 234 is selected by the user when the "FUNCTION" key 212 is actuated. The function screen allows for the simultaneous display of up to four lines of function information of which three lines are shown. A cursor control is provided comprising keys 214A, 214B, 214C and 214D for controlling a displayed cursor position. Cursor key 214A moves the cursor left, cursor key 214B moves the cursor right, cursor key 214C moves the cursor up, and cursor key 214D moves the cursor down. The cursor position, in this embodiment is indicated by visually inverting the icon of the function selected, such as the "MESSAGE SELECTED" icon 216. Thus, as for example, to mute the audio, the speaker icon 218 is selected using the cursor control, after which the function key 212 is actuated to enable the function. When receiver operating information is required for the speaker icon function, the user would first use the cursor to select the "HELP" function icon 220 followed by actuating the "FUNCTION" key 212, followed by using the cursor to select the "SPEAKER" function icon 218 followed by actuating the "FUNCTION" key 212. Information, in this embodiment, is also displayed in four lines of text, each line displaying up to twenty characters. The following is an example of the display which would be presented.

| Screen 1 | SELECT SPEAKER ICON FROM FUNCTION MENU TO TOGGLE PAGER BETWEEN AUDIBLE |
| Screen 2 | ALERT AND MEM-O-LERT. THE CURRENT STATUS IS DETERMINED BY THE STATE OF THE SPEAKER |
| Screen 3 | ANNUNCIATOR ON THE STATUS SCREEN. |

As can be seen from the above example, the number of characters being displayed per line, and the number of lines being displayed per screen is increased, the readability of messages and the receiver operating information becomes easier. For a more detailed description of the receiver operating functions illustrated by the icons of the "FUNCTION" screen 234, referenced is directed to U.S. patent application Ser. No. 07/405152 filed Sept. 11, 1989 by Weitzen et al, entitled "Selective Call Receiver" the description of which is hereby incorporated by reference herein.

An alternate embodiment of the present invention is shown in FIG. 2C. In this embodiment, after the function key 212 is actuated, a HELP display 222 is presented. This HELP display allows the user to obtain information on receiver operation, not specifically defined by a standby screen icon, such as for setting predetermined volume level maximums (ALERT icon 224), over-the-air programming features (OTA icon 226), available option information (OPTION icon 228), setting the real time clock time and alarm functions (CLOCK icon 230), and using the print feature (PRINT icon 232). It will be appreciated that additional feature related icons may be provided as well to cover other feature descriptions.

Reference is now directed to FIG. 3 which shows a communication system 10 in which the present invention may be advantageously utilized. The system includes a terminal apparatus 20, and a plurality of selective call receivers 12 having remotely programmable memory. Such receivers are described in U.S. Pat. No. 4,839,628 to Davis et al., entitled "Paging Receiver having Selectively Protected Regions of Memory". System 10 is shown as providing acknowledge back capability, which may be advantageously utilized, although such capability is not specifically required the present invention. Terminal 20 is capable of generating and transmitting selective call messages to which the selective call receivers are responsive in a manner well known to one of ordinary skill in the art. Terminal apparatus 20 also functions as an external source for remotely generating and transmitting reconfiguration information used to alter the content of the memory of the selective call receiver. The reconfiguration information includes such information as required to reprogram receiver operating functions, as well as to reprogram receiver operating information describing the operations of the receiver which have been changed or added by reprogramming.

Terminal apparatus 20 of FIG. 3 is shown in greater detail in FIG. 4 together with the associated equipment and the paging files intended to be generated to effect the advantages of the present invention. As shown therein, terminal apparatus 20 includes a controller 22 which, inter alia, also includes an address and data encoder 24 and an acknowledge back decoder 26, which as previously described, is not necessarily required for the operation of the present invention. Associated with controller 22 is an entry device 30, a real time clock 32, and a transmitter 34 and receiver 36 operating in connection with antenna 38 and antenna switch 40.

Entry device 30 is used by the system operator to access controller 22 to enter receiver ID's (identification numbers) and messages therefor for subsequent transmission. Entry device 30 as shown is a video display terminal which is useful for entering numeric or alphanumeric messages, for entering information for remotely altering the content of the memory of the selective call receivers, for entering receiver operating information describing receiver operation, and for accessing and updating the subscriber list 42. Subscriber list 42 contains several items that will be needed by controller 22 to transmit a selective call message, or page, including such information as the selective call receiver ID and the associated receiver type (acknowledge back or non-acknowledge back and numeric, alphanumeric or tone), the particular receiver address, and a programming authorization number, when required. Additional entry devices, such as touch tone telephones may be interconnected to controller 22 through a local telephone network for providing direct user access to controller 22 for sending selective call messages and for initiating requests for remote reprogramming of various receiver functions.

As will be appreciated, controller 22 is the essential heart of system 10 and controls the operation of the other associated elements of terminal apparatus 20. In addition to the subscriber list 42 maintained by controller 22, an active page file 44 is maintained and comprises a temporary file containing information about the selective call messages and memory reconfiguration information being processed by terminal apparatus 20. The active page file 44 includes the receiver address and associated message information for selective call messages. The active page file 44 also includes the receiver address, a programming access code, when required, and the requested reconfiguration information for remote, or over-the-air reprogramming of the receiver memory. When acknowledge back capability is provided in the system, an unacknowledged page file 46 is likewise maintained in which undelivered messages are stored. The unacknowledged page file 46 may also be used to temporarily store reconfiguration information for which the transmission is automatically delayed at the request of a receiver, or when the receiver fails to acknowledge receipt of the transmitted address. The real time clock 32 is used to supply timing information to controller 22 and for time stamping undelivered or delayed messages and delayed reconfiguration information in the unacknowledged page file 46.

Address and data encoder 24 accepts the selective call receiver ID and message information and formats the corresponding address and message to the actual transmitted bit patterns in a manner well known in the art. Address and data decoder 24 also accepts the request for memory alteration, formatting the corresponding bit pattern for over-the-air reprogramming of the memories of the selective call receivers. These bit patterns are subsequently transmitted by transmitter 34 through antenna switch 40 and antenna 38 which radiates the signal to the receivers. When acknowledge back capability is provided the selective call receivers include a transmitter for transmitting an acknowledge back response generated by acknowledge back encoder in a manner well known in the art. Acknowledge back decoder 26 detects and processes these acknowledgements and provides this information to controller 22. When acknowledge back capability is provided in selective call receiver 12, and receiver 12 is capable of being over-the-air reprogrammed, controller 22 can be directed by the acknowledge back response to delay the transmission of reconfiguration information, and to transmit the reconfiguration information in a data block size consistent with the temporary memory space available in the receiver.

Figure 5:
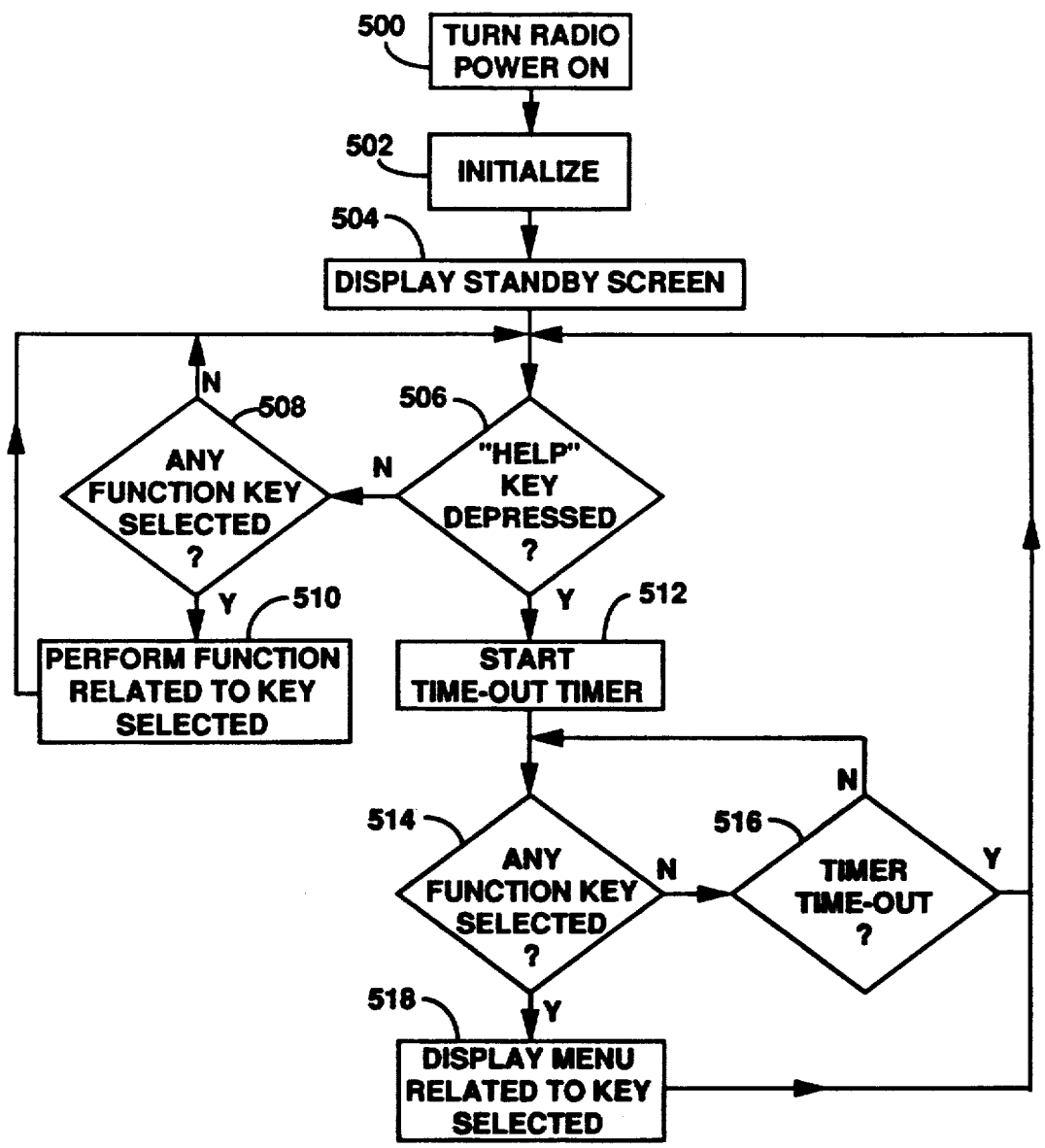
FIG. 5 is a flow chart illustrating a first embodiment of the present invention which provides user recallable stored receiver operating information for a selective call receiver having a display.

FIG. 5 is a flow chart illustrating a first embodiment for providing user recallable stored receiver operating information for a selective call receiver having a display, such as shown in FIG. 2A. When the radio power is turned on, at step 500, the microcomputer decoder is initialized, at step 502. Following initialization, a standby screen is displayed, at step 504. The microcomputer decoder, hereafter referred to as the microcomputer, functioning as a controller for monitoring key switch operation and as a message display controller, periodically scans the "HELP" key to determine when the "HELP" key is actuated, at step 506. When the microcomputer determines the "HELP" key is not actuated, at step 506, the microcomputer scans the other function keys in a predetermined sequence, to determine if any of the function keys are actuated, at step 508. When the microcomputer determines none of the function keys are actuated, at step 508, the microcomputer continues to periodically scan the "HELP" key and functions keys, at steps 506 and 508. When the microcomputer detects one of the function keys is actuated, at step 508, without the "HELP" key being actuated, at step 506, the microcomputer performs the function related with the key actuated, at step 510, such as reading a message, or holding a message on the display screen. When the microcomputer detects that the "HELP" key is actuated, at step 506, a time-out timer is started, at step 512. The microcomputer again scans the function keys in a predetermined sequence, to determine if any of the function keys are actuated, at step 514. When the microcomputer determines none of the function keys are actuated, at step 14, the microcomputer checks to see if the time-out timer is timed out, at step 516. If the time-out time is timed out, at step 516, the microcomputer returns to scan the "HELP" key and the function keys, at steps 506 and 508. When the time-out timer is not timed out, at step 516, and actuation of one of the function keys is detected, at step 514, the microcomputer, instead of performing the function associated with the function key actuated, retrieves and displays the menu, or receiver operating information, related to the key. When a specific key sequence is indicated for the function, the key sequence can often be determined by actuating only a partial key sequence, at step 518. After the receiver operating information is displayed, at step 518, the microcomputer returns to scan the "HELP" key and the function keys, at steps 506 and 508.

In summary, when a function key is actuated, following the actuation of the "HELP" key, the microcomputer retrieves and displays the receiver operating information related to the key actuated instead of performing the function associated with the function key actuated.

Figure 6A:
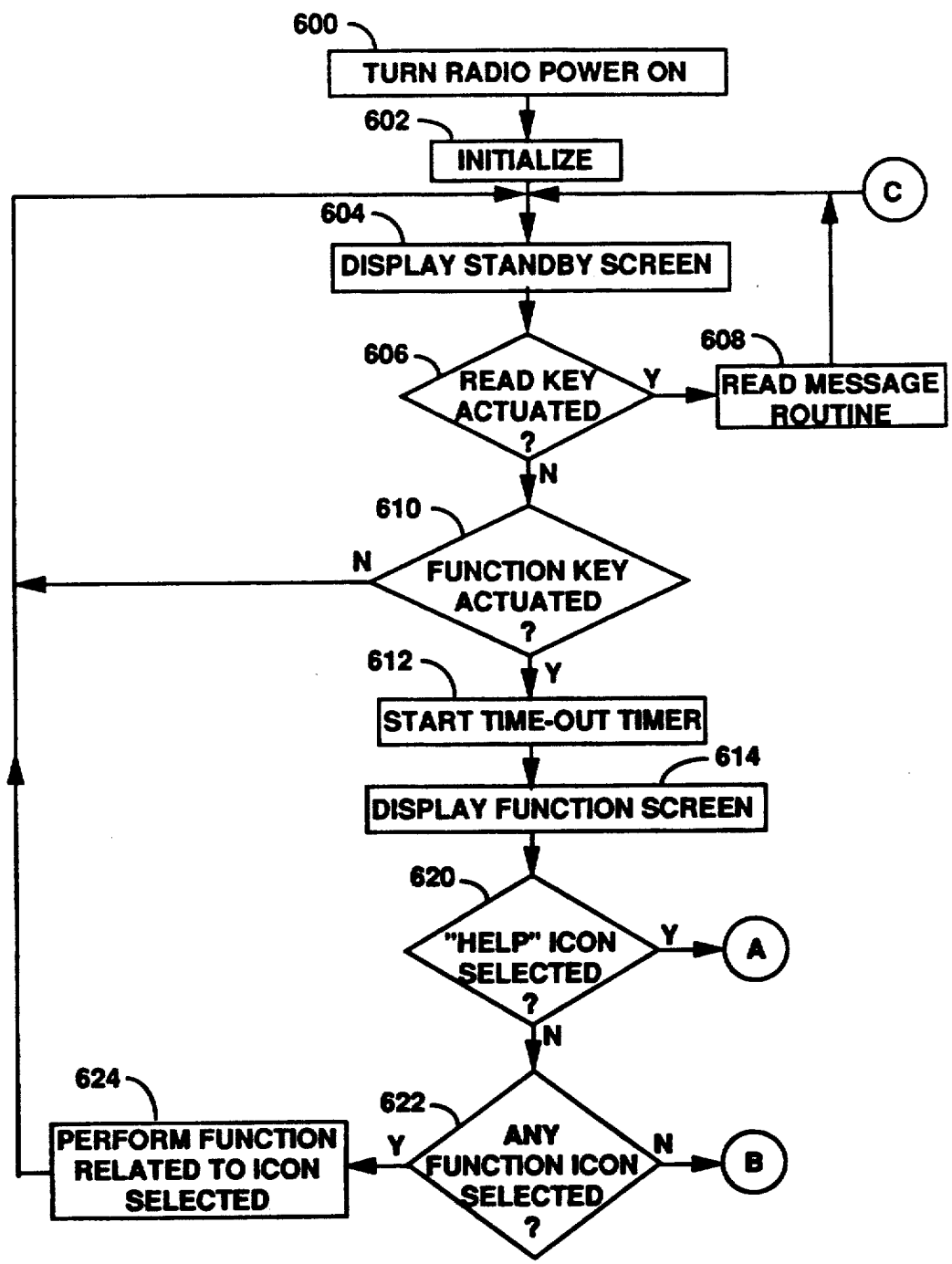
FIG. 6A, 6B and 6C are flow charts illustrating a second embodiment of the present invention which provides user recallable stored receiver operating information for a selective call receiver having a display.
Figure 6B:
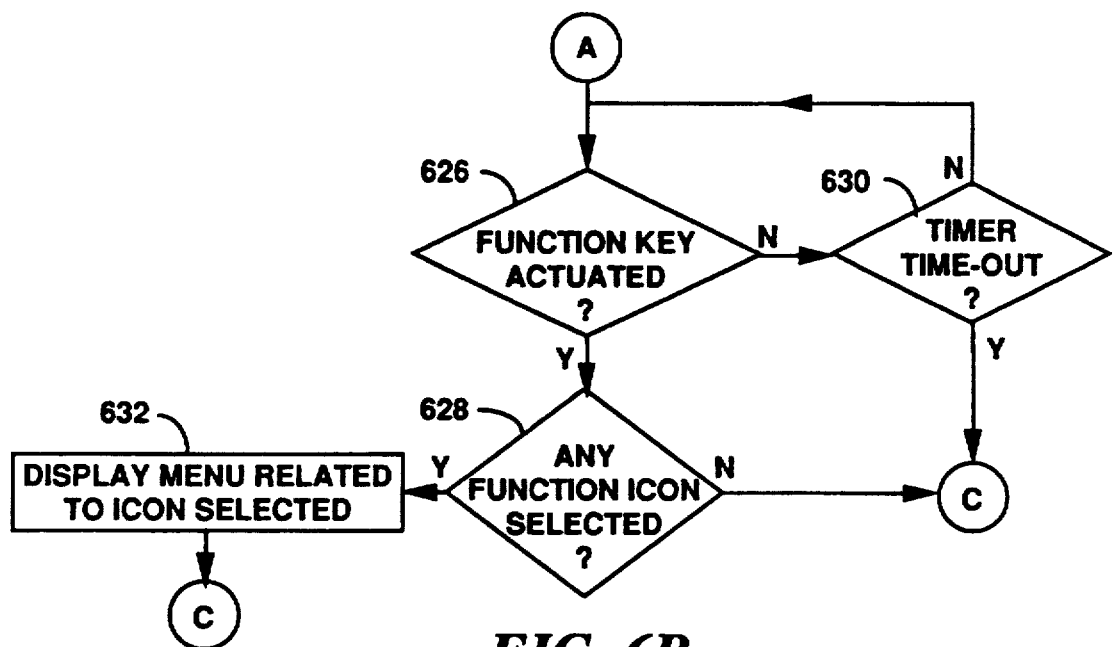
Figure 6C:
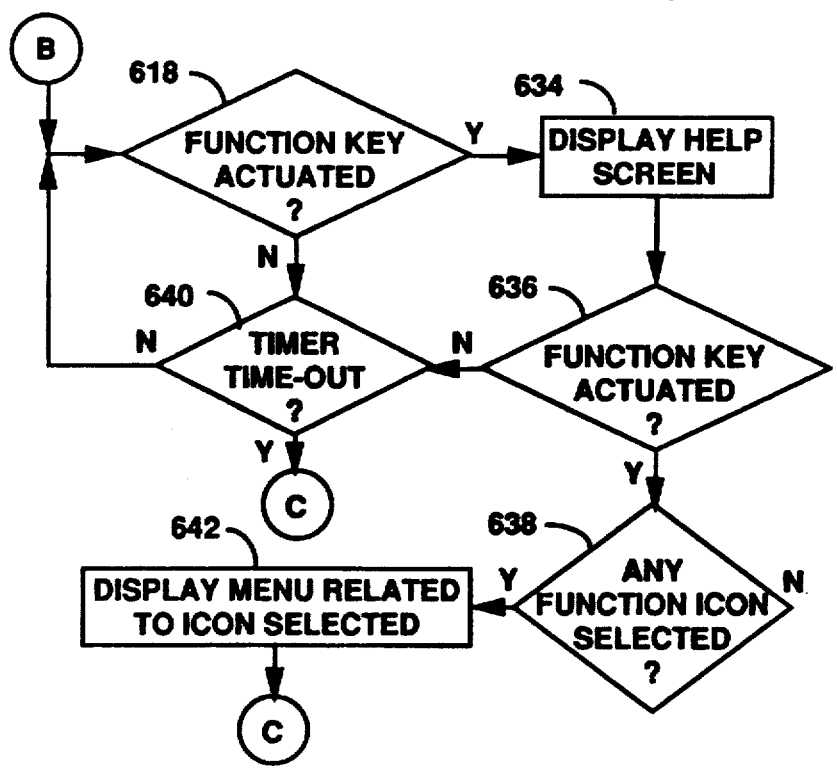

FIGS. 6A-6C are flow charts illustrating a second embodiment for providing user recallable stored receiver operating information for a selective call receiver having a display, such as depicted in FIG. 2B and 2C. When the radio power is turned on, at step 600 of FIG. 6A, the microcomputer decoder is initialized, at step 602. Following initialization, the microcomputer displays a standby screen, at step 604. The microcomputer periodically scans the "READ" key, at step 606, and the "FUNCTION" key, at step 610. When the microcomputer detects the "READ" key is actuated, at step 606, the microcomputer enters the read message routine, at step 608, to retrieve and display either the message currently received, or the message currently selected. Following the retrieval and display of the message, at step 608, the microcomputer proceeds to display the standby screen, at step 604.

When the microcomputer detects the "FUNCTION" key is actuated, at step 610, the microcomputer starts a time-out timer, at step 612, and then displays the function screen, at step 614.

When the "HELP" icon is selected, at step 620, the microcomputer determines when the "FUNCTION" key is actuated, at step 626, at which time the HELP routine described by FIG. 6B is entered by the microcomputer. When any function icon is selected and the microcomputer determines the "FUNCTION" key is actuated, at step 622, the microcomputer performs the function related to the function icon selected, at step 624. When the microcomputer determines no function icon is selected, at step 622, when the "FUNCTION" key is actuated, at step 618, the microcomputer proceeds to display the HELP screen, at step 634 of FIG. 6C.

When the microcomputer enters the HELP routine described by FIG. 6B, the microcomputer periodically scans to determine when the "FUNCTION" key is actuated, at step 626. When the "FUNCTION" key is not actuated, at step 626, and the time-out timer times out, at step 630, the microcomputer again proceeds to display the standby screen, at step 604 of FIG. 6A.

When any function icon is selected, at step 628 of FIG. 6B, when the "FUNCTION" key is actuated, at step 626, the microcomputer displays the receiver operating information menu related to the function icon selected, at step 632. When the display of the receiver operating information menu is complete, the microcomputer again proceeds to display the standby screen, at step 604 of FIG. 6A. When no function icon was selected, at step 628, when the "FUNCTION" key is actuated, at step 626, the microcomputer also proceeds to display the standby screen, at step 604 of FIG. 6A.

When the microcomputer displays the HELP screen, at step 634 of FIG. 6C, the microcomputer periodically scans to determine when the "FUNCTION" key is actuated, at step 636. When the "FUNCTION" key is not actuated, at step 636, and the time-out timer times out, at step 640, the microcomputer again proceeds to display the standby screen, at step 604 of FIG. 6A.

When any HELP function icon is selected, at step 638 of FIG. 6C, when the "FUNCTION" key is actuated, at step 636, the microcomputer displays the receiver operating information menu related to the HELP function icon selected, at step 642. When the display of the receiver operating information menu is complete, the microcomputer again proceeds to display the standby screen, at step 604 of FIG. 6A. When no HELP function icon is selected, at step 638, when the "FUNCTION" key is actuated, at step 636, the microcomputer also proceeds to display the standby screen, at step 604 of FIG. 6A.

In summary, when the "FUNCTION" key is actuated, following the selection of the "HELP" icon, the microcomputer enters one of the HELP routines described in steps 626-632 of FIG. 6B or 634-642 of FIG. 6C. The microcomputer is capable of displaying receiver control information relating to the receiver control functions active for the receiver, as well as other receiver control or help information which can be selected from a HELP screen.

An apparatus for providing the display of receiver control information describing the operation of the receiver control functions was described above. The receiver control information is stored within a memory in the receiver, and comprises a table which in one embodiment describes all receiver control functions provided for a particular receiver type, or model. When the receiver control functions are programmable, and only a portion of the receiver control functions are active in any particular receiver, the receiver control functions stored can comprise a table of receiver control information describing all receiver control functions, or con comprise a table of receiver control functions describing only the portion of the receiver control functions which are active. When the receiver includes the provision for programming, either directly using a programmer, or indirectly using over-the-air programming, receiver control functions and receiver control function information can be readily changed, allowing control functions to be added or deleted. Because the receiver control information is updated when the receiver control functions are reprogrammed, the user does not have to resort to the use of supplemental operating instruction information, thereby always maintaining such information to be available to the user.

While specific embodiments of this invention have been shown and described, further modifications and improvements will occur to those skilled in the art. All modifications which retain the basic underlying principles disclosed and claimed herein are within the scope and spirit of the present invention.

I claim:

1. A communication receiver, comprising:
   receiving means for receiving selective call signals including messages, and further for receiving a receiver operating instruction;
   control means for controlling a receiver function;
   memory means for storing the received receiver operating instruction which describes the operation of the receiver function being controlled;
   retrieval means for recalling the stored receiver operating instruction; and
   presentation means for presenting the received messages, and further for presenting the recalled operating instruction.

2. The communication receiver according to claim 1, wherein said control means comprises means for controlling a plurality of receiver functions.

3. The communication receiver according to claim 2, wherein said control means comprises switch means for selectively controlling the plurality of receiver functions.

4. The communication receiver according to claim 2, wherein said control means comprises operation selection means displayed on said presentation means for indicating the plurality of receiver functions being selectively controlled.

5. The communication receiver according to claim 2, wherein said memory means stores receiver operating instructions describing each of the plurality of receiver functions being controlled.

6. The communication receiver according to claim 5, wherein said retrieval means recalls receiver operating instructions corresponding to the receiver function currently being selected for control by said control means.

7. The communication receiver according to claim 1, wherein said memory means further comprises a portion for storing the received messages.

8. A communication receiver, comprising:
   receiving means for receiving selective call signals including messages, and further for receiving receiver operating instructions;
   memory means for storing information enabling one or more controllable receiver functions, and further for storing received receiver operating instructions which describe the operation of the receiver functions being controlled;
   control means, responsive to the enabling information for controlling the enabled receiver functions;
   retrieval means for recalling the stored receiver operating instructions of the enabled receiver functions; and
   presentation means for presenting the received messages and further for presenting the recalled receiver operating instructions.

9. The communication receiver according to claim 8, wherein said control means comprises means for controlling a plurality of receiver functions.

10. The communication receiver according to claim 9, wherein said control means comprises switch means for selectively controlling the plurality of receiver functions.

11. The communication receiver according to claim 9, wherein said control means comprises operation selection means displayed on said presentation means for indicating the plurality of receiver functions being selectively controlled.

12. The communication receiver according to claim 9, wherein said memory means stores receiver operating instructions describing each of the plurality of receiver functions being controlled.

13. The communication receiver according to claim 10, wherein said retrieval means recalls receiver operating instructions corresponding to the receiver function currently being selected for control by said control means.

14. The communication receiver according to claim 8, wherein said memory means further comprises a portion for storing the received messages.

15. A communication receiver, comprising:
   receiving means for receiving selective call signals including messages, and further for receiving receiver reprogramming information including receiver control information and receiver operating instructions corresponding thereto;
   memory means for storing receiver control information enabling one or more controllable receiver functions, and further for storing receiver operating instructions describing the operation of the receiver functions being controlled;
   control means, responsive to the enabling information for controlling the enabled receiver functions;
   reconfiguration means, responsive to the received receiver reprogramming information, for reprogramming the receiver control information stored for enabling the one or more controllable receiver functions, and further for reprogramming the receiver operating instructions describing the receiver function being controlled corresponding thereto;
   retrieval means for recalling the messages, and further for recalling the receiver operating instructions of the enabled receiver functions; and
   presentation means for presenting the received messages and further for presenting the recalled receiver operating instructions.

16. The communication receiver according to claim 15, wherein said control means comprises means for controlling a plurality of receiver functions.

17. The communication receiver according to claim 16, wherein said control means comprises switch means for selectively controlling the plurality of receiver functions.

18. The communication receiver according to claim 16, wherein said control means comprises operation selection means displayed on said presentation means for indicating the plurality of receiver functions being selectively controlled.

19. The communication receiver according to claim 16, wherein said memory means stores receiver operating instructions describing each of the plurality of receiver functions being controlled.

20. The communication receiver according to claim 17, wherein said retrieval means recalls the particular receiver operating instructions corresponding to the receiver function currently being selected for control by said control means.

21. The communication receiver according to claim 15, wherein said memory means further comprises a portion for storing the received messages.

22. The communication receiver according to claim 16, wherein the receiver reprogramming information includes information for controlling at least one additional receiver function and the receiver operating instructions corresponding thereto.

* * * * *